United States Patent [19]
Murakami

[11] Patent Number: 5,413,195
[45] Date of Patent: May 9, 1995

[54] SHOCK ABSORBER
[75] Inventor: Tomoharu Murakami, Gifu, Japan
[73] Assignee: Kayaba Kogyo Kabushiki Kaisha, Tokyo, Japan
[21] Appl. No.: 221,556
[22] Filed: Mar. 31, 1994

Related U.S. Application Data

[60] Continuation of Ser. No. 966,719, Oct. 26, 1992, abandoned, which is a division of Ser. No. 857,710, Mar. 25, 1992, Pat. No. 5,332,069, which is a continuation of Ser. No. 575,201, Aug. 30, 1990, abandoned.

[30] Foreign Application Priority Data

Aug. 31, 1989 [JP] Japan ................... 1-102277
Nov. 28, 1989 [JP] Japan ................... 1-136789

[51] Int. Cl.⁶ .................................... F16F 9/348
[52] U.S. Cl. ........................ 188/282; 188/322.15
[58] Field of Search ............... 137/512.3; 188/282, 188/315, 317, 322.13–322.15; 267/127

[56] References Cited

U.S. PATENT DOCUMENTS

| | | | |
|---|---|---|---|
| 3,837,445 | 9/1974 | Fierle | 188/282 X |
| 4,076,276 | 2/1978 | Wijnhoven et al. | 288/315 X |
| 4,088,207 | 5/1978 | Kato | 188/317 X |
| 4,782,925 | 11/1988 | Grundei | 188/315 X |
| 4,964,493 | 10/1990 | Yamaura et al. | 188/322.15 |
| 5,042,624 | 8/1991 | Furuya et al. | 188/282 X |

FOREIGN PATENT DOCUMENTS 1553977 1/1969 France ...................... 188/322.14

Primary Examiner—Robert J. Oberleitner
Assistant Examiner—Alfred Muratori
Attorney, Agent, or Firm—McGlew and Tuttle

[57] ABSTRACT

The invention provides a hydraulic shock absorber for controlling an attenuating force in a very low speed range and a medium or high speed range of the speed of a piston. A leaf valve for the high speed range and another leaf valve for the medium or high speed range are disposed for opening and closing movement at an exit end of a port formed in a partition wall member such as the piston. The leaf valve for the low speed range is supported at a rear face of an inner peripheral portion thereof for up and down floating movement on an upper face of a valve stopper. In the medium or high speed range, the leaf valve for the low speed range is deflected to move the inner peripheral portion thereof floatingly, which prevents the leaf valve from being deflected excessively and hence prevents a possible break of the leaf valve.

10 Claims, 7 Drawing Sheets

SHOCK ABSORBER

This is a continuation of application Ser. No. 07/966,719 filed Oct. 26, 1992 now abandoned, which is a divisional of application Ser. No. 07/857,710 filed on Mar. 25, 1992 now U.S. Pat. No. 5,332,069, which is a continuation of Ser. No. 07/575,201 filed Aug. 30, 1990 abandoned.

BACKGROUND OF THE INVENTION

1. Field of the Invention

This invention relates to a hydraulic shock absorber suitable for use in control of the attenuating force of a piston in a medium or high speed range of the speed of the piston and also in control of the attenuating force of the piston in a very low speed range of the speed of the piston.

2. Description of the Prior Art

In recent years, there is a tendency that a hydraulic shock absorber is formed such that, in order to improve, for example, the drivability and the stability in driving of a vehicle, it may perform not only control of attenuating force of a piston in a medium or high speed range of the speed of the piston but also control of the piston in a very low speed range of the speed of the piston.

An exemplary one of conventional hydraulic shock absorbers is disclosed, for example, in Japanese Utility Model Laid-Open No. 60-101242. The conventional hydraulic shock absorber is shown in FIG. 11. Referring to FIG. 11, the conventional hydraulic shock absorber includes a cylinder 1, a piston member 2 disposed in the cylinder 1 to define an upper or first oil chamber A and a lower or second oil chamber B in the cylinder 1 and constructed to communicate the oil chambers A and B with each other, and an expansion side attenuating valve 3 mounted on the piston member 2.

The attenuating valve 3 includes a leaf valve 3a disposed on the upstream side for generating the attenuating force in the very low speed range of the speed of the piston, and another leaf valve 3b disposed on the downstream side for generating an attenuating force in the medium or high speed range of the speed of the piston. Each of the leaf valves 3a and 3b is secured at an inner peripheral portion thereof and constructed to be deflected at an outer peripheral portion thereof to generate a predetermined attenuating force.

The leaf valve 3a is disposed such that it closes an opening at a lower end of an inner port 20a perforated in a piston body 20 which constitute the piston member 2 while the other leaf valve 3b is disposed such that it covers over the leaf valve 3a from below. A spring sheet 4 is disposed on a back or lower face of the leaf valve 3a, and it is normally acted upon by urging force of a spring 5 from below.

With the hydraulic shock absorber, when the piston member 2 is making an expanding movement in which it moves up in the cylinder 1 and the piston speed is in the very low speed range, an outer peripheral portion of the leaf valve 3a is deflected by a flow of hydraulic operating fluid from the upper oil chamber A which serves as a higher pressure side oil chamber, whereupon a predetermined attenuating force is generated. On the other hand, in the medium or high speed range of the piston speed, an outer peripheral portion of the leaf valve 3b is deflected, in addition to such deflection of the leaf valve 3a as described above, by a flow of hydraulic operating fluid from the oil chamber A to push down the spring sheet 4 overcoming the urging force of the spring 5, whereupon a predetermined attenuating force is generated.

Incidentally, the piston member 2 of the conventional hydraulic shock absorber is constructed such that hydraulic operating fluid coming around an outer peripheral portion of the leaf valve 3a is introduced into an outer port 20b perforated at a location of the piston body 20 radially outwardly of the inner port 20a by way of a sub port 20c.

The conventional hydraulic shock absorber, however, is disadvantageous in that the life of the leaf valve 3a is short.

In particular, the conventional hydraulic shock absorber carries out high attenuating force control when the leaf valve 3b is deflected. Thereupon, however, an outer peripheral portion of the leaf valve 3a is deflected simultaneously over a greater extent, and accordingly, the leaf valve 3a is deflected every time an attenuating force is generated by the hydraulic shock absorber. Since the leaf valve 3a is secured at an inner peripheral portion thereof, it is likely to be damaged of broken due to such repetitive deflections, which will decrease the life of the leaf valve 3a.

SUMMARY OF THE INVENTION

It is an object of the present invention to provide a hydraulic shock absorber wherein the life of a leaf valve for the control of the attenuating force in a very low speed range of the speed of a piston is improved and such control of the attenuating force in the very low speed range of the piston speed is facilitated.

It is another object of the present invention to provide a hydraulic shock absorber wherein controls of the attenuating force in a very low speed range and in a medium or high speed range of the speed of a piston can be performed independently of each other.

It is a further object of the present invention to provide a hydraulic shock absorber wherein a leaf valve is superior in durability and can expand the degree of freedom in the attenuating force characteristic in a very low speed range of the speed of a piston.

In order to attain the objects according to the present invention, there is provided a hydraulic shock absorber, comprising a cylinder, a partition wall member disposed in the cylinder to define a pair of oil chambers in the cylinder, the oil chambers being in communication with each other by way of a port formed in the partition wall member, an attenuating valve located at an exit end of the port for opening and closing movement, the attenuating valve including a leaf valve for a low speed range and another leaf valve for a medium or high speed range disposed in a suitable spaced relationship on the rear face side of the leaf valve for the low speed range, and a valve stopper for supporting, on an upper face thereof, a rear face of an inner peripheral portion of the leaf valve for the low speed range for up and down floating movement.

With the hydraulic shock absorber, when the hydraulic shock absorber is making an expanding movement and the speed of the piston is in a very low speed range, hydraulic operating fluid from one of the oil chambers in the cylinder remote from the exit end of the port deflects an outer peripheral portion of the leaf valve for the low speed range, whereupon predetermined attenuating force is generated by such deflection of the outer peripheral portion of the leaf valve for the low speed range.

In this instance, the inner peripheral portion of the leaf valve for the low speed range is supported in a fixed condition on the valve stopper.

On the other hand, when the hydraulic shock absorber is making an expanding movement and the piston speed is in the medium or high speed range, hydraulic operating fluid from the one oil chamber in the cylinder deflects the outer peripheral portion of the leaf valve for the low speed range, which then deflects an outer peripheral portion of the leaf valve for the medium or high speed range so that it flows out into the other oil chamber, whereupon another high predetermined attenuating force is generated by such deflection of the outer peripheral portion of the leaf valve for the medium or high speed range.

When the outer peripheral portion of the leaf valve for the medium or high speed range is deflected, the inner peripheral portion of the leaf valve for the low speed range is supported in a floating condition on the valve stopper. Consequently, the leaf valve for the low speed range is prevented from being deflected excessively.

The above and other objects, features and advantages of the present invention will become apparent from the following description and the appended claims, taken in conjunction with the accompanying drawings in which like parts are denoted by like reference characters all through the drawings.

DETAILED DESCRIPTION OF THE PREFERRED EMBODIMENTS

Figure 1:
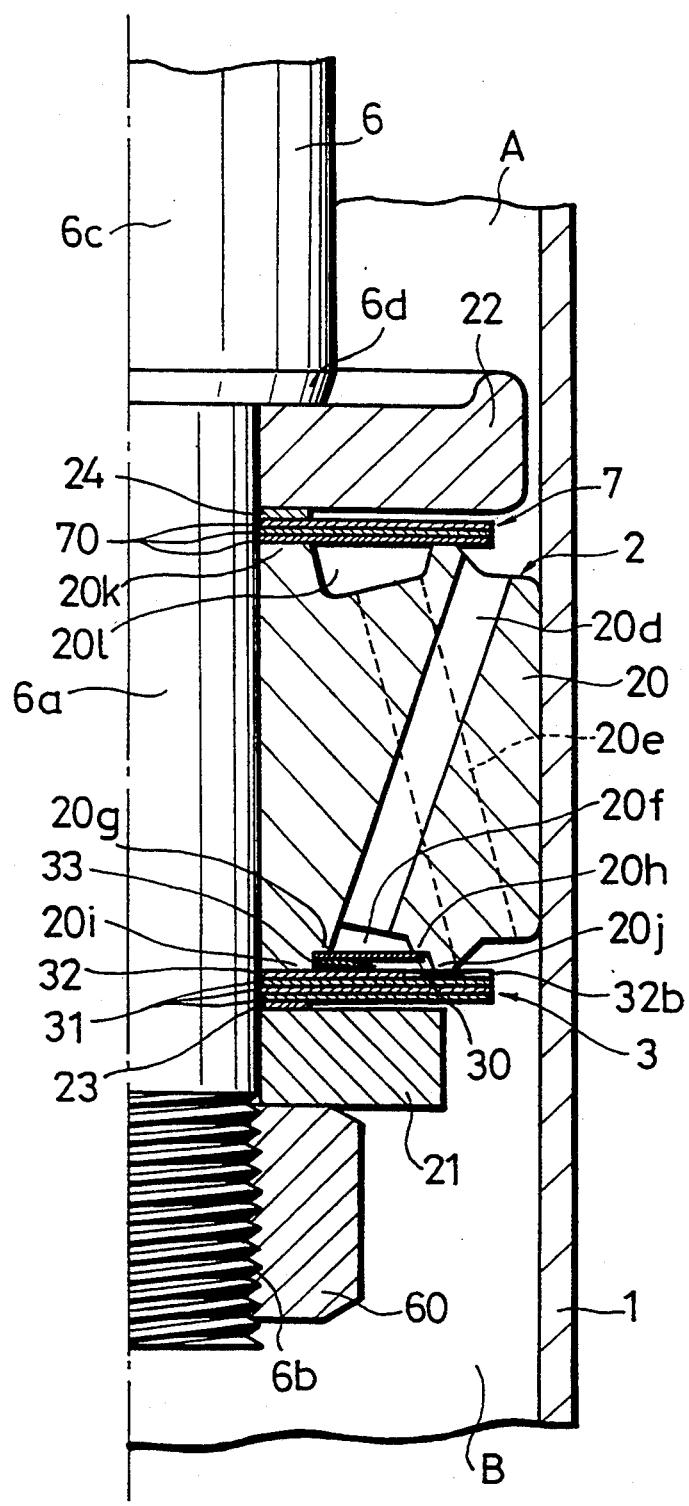
FIG. 1 is a partial vertical sectional front elevational view of a hydraulic shock absorber showing an embodiment of the present invention.

Referring first to FIG. 1, there is shown a hydraulic shock absorber to which the present invention is applied. The hydraulic shock absorber shown includes a cylinder 1, a piston rod 6 fitted for movement into and out of the cylinder 1, and a piston member 2 serving as a partition wall member mounted at an end of the piston rod 6.

The piston member 2 includes a piston body 20 disposed in the cylinder 1 to define two oil chambers including an upper oil chamber A and a lower oil chamber B in the cylinder 1 and has a pair of ports 20d and 20e perforated therein so as to communicate the oil chambers A and B with each other when the piston member 2 is slidably moved in the cylinder 1 upon movement of the piston rod 6 into and out of the cylinder 1.

The piston member 2 further includes an expansion side attenuating valve 3 mounted on the piston body 20 thereof adjacent an exit opening at a lower end of the port 20d while a compression side attenuating valve 7 is mounted on the piston body 20 adjacent an exit opening at an upper end of the other port 20e.

The piston rod 6 has a faucet portion 6a extending from a shaft portion 6c into the cylinder 2 with a stepped portion 6d formed therebetween. A threaded portion 6b is formed at a lower end portion of the faucet portion 6a of the piston rod 6, and a piston nut 60 is screwed on the threaded portion 6b. A stopper 21 is disposed on the piston nut 60 and fitted around the faucet portion 6a of the piston rod 6. Another stopper 22 is disposed just below the stepped portion 6d of the piston rod 6 and fitted around the faucet portion 6a of the piston rod 6. The expansion side attenuating valve 3 and the compression side attenuating valve 7 are held at inner peripheral portions thereof between an upper end face of the stopper 21 and a lower end face the other stopper 22 by way of a pair of annular seats 23 and 24, respectively, with the piston body 20 held therebetween.

The expansion side attenuating valve 3 utilizes the piston body 20 as a valve seat member thereof and is disposed at a lower end in FIG. 1 of the piston body 20 such that it is opposed to an annular groove 20f which is formed at the lower end of the piston body 20 in a contiguous relationship to an opening at a lower end of the port 20d formed in the piston body 20. The expansion side attenuating valve 3 includes a leaf valve 30 for a low speed range, a plurality of leaf valves 31 for a medium or high speed range and a recessed leaf valve 32 and is constructed such that it generates predetermined attenuating force by deflection of an outer peripheral portion of the leaf valve 30 when the piston speed is in a very low speed range, but it generates, when the piston speed is in a medium or high speed range, another predetermined attenuating force by deflection of outer peripheral portions of the leaf valves 31 and the recessed leaf valve 32.

Figure 2A:
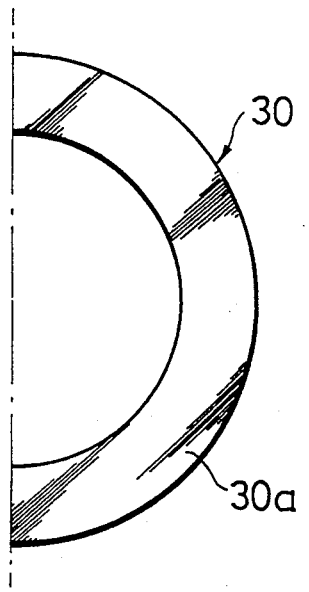
FIGS. 2(A), 2(B) and 2(C) are partial plan views of different leaf valves of an attenuating valve of the hydraulic shock absorber of FIG. 1.

The leaf valve 30 has a body portion 30a formed as an annular narrow ring as shown in FIG. 2(A) and disposed fixedly on inner and outer annular valve seat portions 20g and 20h which are formed on the piston body 20 such that they are stepped with respect to the annular groove 20f.

Figure 2C:
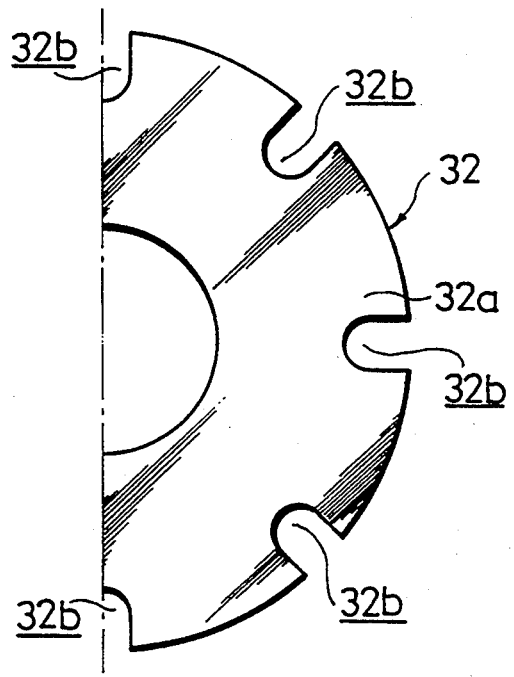
Figure 2B:
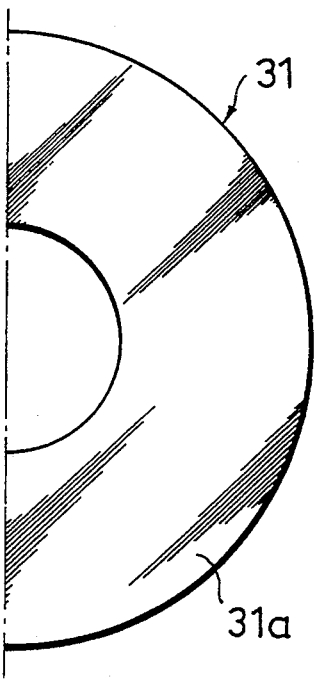

The leaf valves 31 are disposed in layers and each has a body portion 31a formed as an annular wide ring as shown in FIG. 2(B). The leaf valves 31 are held at inner peripheral portions thereof between the annular seat 23 and an inner periphery fixing portion 20i of the piston body 20 with the recessed leaf valve 32 interposed between the leaf valves 31 and the inner periphery fixing portion 20i of the piston body 20.

The leaf valves 31 are disposed such that outer peripheral portions thereof are opposed to an annular valve seat portion 20j formed at a location of the piston body 20 radially outwardly of the annular groove 20f to define the annular groove 20f.

The recessed leaf valve 32 has, as shown in FIG. 2(C), a body portion 32a formed as a wide annular ring and has a plurality of recessed holes 32b formed in a suitable circumferentially spaced relationship along an outer periphery of the body portion 32a thereof.

The recessed leaf valve 32 lies on a pressure receiving face, that is, a top face of the leaf valves 31. Thus, the recessed leaf valve 32 is fixedly held at an inner peripheral portion thereof together with inner peripheral portions of the leaf valves 31 while it contacts at an outer peripheral portion thereof with the annular valve seat portion 20j of the piston body 20.

A valve stopper 33 having suitable spring force and serving as an urging member is interposed between the leaf valve 30 and the recessed leaf valve 32, and the leaf valve 30 is supported on an upper face of the valve stopper 33 such that it may be floatingly movable at an inner peripheral portion thereof.

Figure 2D:
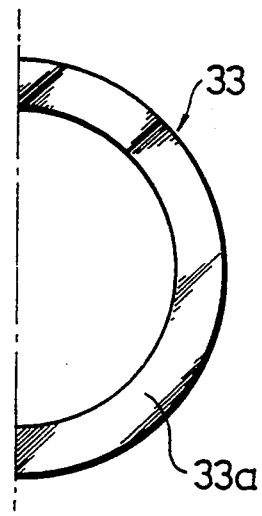
FIG. 2(D) is a plan view of a valve stopper of the hydraulic shock absorber of FIG. 1.

In particular, the valve stopper 33 has a body portion 33a formed as a narrow annular ring as shown in FIG. 2(D) and has a curved cross section as taken in a radial direction such that it may generally have the form of an initially coned disk spring of a leaf spring.

The valve stopper 33 is disposed such that an inner peripheral surface thereof contacts with a lower face of an inner peripheral portion of the leaf valve 30 while an outer peripheral portion thereof contacts with a pressure receiving face of the recessed leaf valve 32 on the pressure receiving face side of the leaf valves 31.

Consequently, the leaf valve 30 resiliently supported on the valve stopper 33, is not restricted from movement at an outer peripheral portion thereof. Accordingly, when the hydraulic pressure acting on a pressure receiving face of the leaf valve 30 is low, the leaf valve 30 is deflected only at an outer peripheral portion thereof, but when the hydraulic pressure is high, the inner peripheral portion of the leaf valve 30 is moved down by hydraulic operating fluid overcoming the spring force of the valve stopper 33.

In short, the leaf valve 30 is supported such that, when the hydraulic pressure acting on the pressure receiving face thereof is high, that is, when the piston speed is in the medium or high speed range, the inner peripheral portion thereof is moved down in response to the hydraulic pressure.

The compression side attenuating valve 7 is composed of a plurality of annular leaf valves 70 layered one on another and is disposed on the other or upper end in FIG. 1 of the piston body 20 such that the piston body 20 may act as a valve seat member therefor.

In particular, the compression side attenuating valve 70 is held at an inner peripheral portion thereof between the stopper 22 and an inner periphery fixing portion 20k of the piston body 20 with the annular seat 24 interposed between the stopper 22 and the compression side attenuating valve 7. The compression side attenuating valve 70 is disposed such that an outer peripheral portion thereof is opposed to an annular groove 201 formed on the piston body 20 in a contiguous relationship to an opening at an upper end of the port 20e.

With the hydraulic shock absorber having such construction as described above, when the piston rod 6 moves into and out of the cylinder 1, the hydraulic shock absorber makes expanding and compressing movement, whereupon the piston member 2 is slidably moved in the cylinder 2.

Then, when the piston member 2 is slidably moved in the cylinder 1, the upper oil chamber A and the lower oil chamber B in the cylinder 2 are communicated with each other by way of the piston member 2. Particularly upon expanding movement of the hydraulic shock absorber, a predetermined expansion side attenuating force is generated by way of hydraulic operating fluid which passes through the attenuating valve 3 disposed on the piston member 2.

In particular, when the hydraulic shock absorber is making an expanding operation and the piston speed is in the very low speed range, hydraulic operating fluid from the upper oil chamber A in the cylinder 1 comes around an outer periphery of the leaf valve 30 to the pressure receiving face of the recessed leaf valve 32 and then flows out into the lower oil chamber B in the cylinder 1 by way of the recessed holes 32a on the outer periphery of the recessed leaf valve 32.

Thereupon, since the leaf valve 30 of the attenuating valve 3 is deflected only at the outer peripheral portion thereof while the inner peripheral portion thereof is supported in a fixed condition under the spring force of the valve stopper 33, predetermined attenuating force is generated upon deflection of such outer peripheral portion of the leaf valve 30.

On the other hand, when the hydraulic shock absorber is making an expanding movement and the piston speed is in the medium or high sped range, the inner peripheral portion of the leaf valve 30 is moved down by a hydraulic pressure of hydraulic operating fluid from the upper oil chamber A in the cylinder 1 overcoming the spring force of the valve stopper 33. Consequently, a greater valve opening is obtained at the outer peripheral portion side of the leaf valve 30.

Accordingly, in the medium or high speed range of the piston speed, hydraulic operating fluid from the upper oil chamber A in the cylinder 1 flows out around the outer periphery of the leaf valve 30 thus opened to a great extent to the pressure receiving face of the valves 31 below and then flows out into the lower oil chamber B while deflecting outer peripheral portions of the valves 31 together with an outer peripheral portion of the recessed leaf valve 32.

Thereupon, a predetermined attenuating force is generated by such defection of the outer peripheral portions of the leaf valves 31 and the recessed leaf valve 32 disposed adjacent the leaf valves 31.

Thus, the leaf valve 30 is supported in a floating condition at the inner peripheral portion thereof when the outer peripheral portions of the leaf valves 31 and recessed leaf valve 32 are defected, that is, when the piston speed exceeds an effective operation range. Accordingly, the leaf valve 30 operates only so as to increase its valve opening for the leaf valves 31 on the downstream side, and consequently, a high deflection lead does not act upon the inner peripheral portion of the leaf valve 30, which will prevent possible trouble with regard to leaf valve 30, such as a break.

Accordingly, with the hydraulic shock absorber of the embodiment described above, it is possible to freely set characteristics of the leaf valve 30 such as rigidity separately from characteristics of the leaf valves 31 and recessed leaf valve 32 such as rigidity or a quantity, and accordingly, not only control of the attenuating force in the medium or high speed range of the piston speed but also control of the attenuating force in the very low speed range of the piston speed can be performed with certainty.

FIGS. 3 to 6 show different forms of the attenuating valve 3 described above. The attenuating valves of FIGS. 3 to 6 have somewhat common constructions to that of the attenuating valve 3 shown in FIGS. 1 to 2(D), and like parts are denoted by like reference numerals and overlapping description thereof is omitted herein to avoid redundancy.

Figure 3:
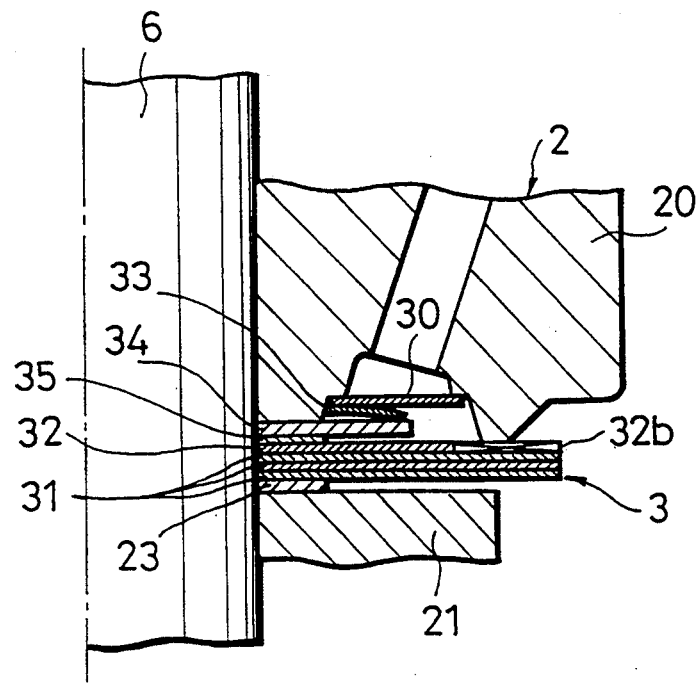
FIGS. 3 to 6 are enlarged partial vertical sectional front elevational views showing different attenuating valves for use with the hydraulic shock absorber of FIG. 1.

Referring first to FIG. 3, the attenuating valve 3 shown includes a stopper member 34 interposed between a valve stopper 33 and a recessed leaf valve 32. The valve stopper 33 is supported at an outer peripheral lower end thereof on the stopper member 34.

A load which acts upon the leaf valve 30 in a medium or high speed range of the piston speed does not at all act upon the recessed leaf valve 32 and hence upon leaf valves 31 by way of the valve stopper 33. Accordingly, it is an advantage that such a load need not be taken into consideration in setting of the leaf valves 31.

It is to be noted that, in the attenuating valve 3 of FIG. 3, an annular seat 35 is interposed between an inner peripheral portion of the stopper member 34 and an inner peripheral portion of the recessed leaf valve 32.

Figure 4:
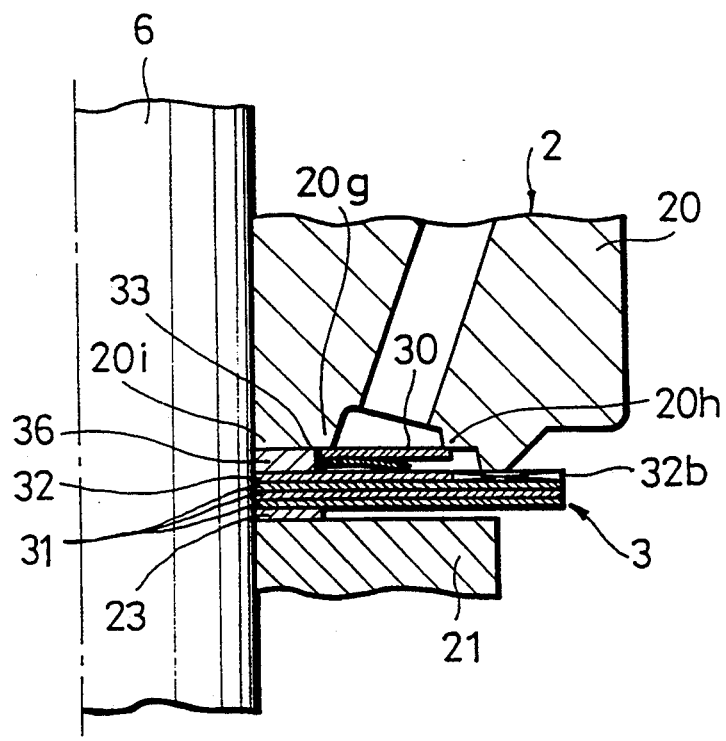

Referring now to FIG. 4, the attenuating valve 3 shown includes a leaf valve 30 received at inner and outer peripheral portions thereof on valve seat portions 20g and 20h formed on radially inner and outer peripheral portions of an end face of a piston body 20. The inner side valve seat portion 20g is formed in level with a fixing portion 20i which is formed on a radially inward portion of the end face of the piston body 20.

An annular seat 36 is disposed on the fixing portion 20i of the piston body 20 radially inwardly of the leaf valve 30 and a valve stopper 33 and is formed so as to have such a thickness as will allow deformation of the valve stopper 33 to provide upward and downward floating movement of the leaf valve 30.

Accordingly, with the attenuating valve 3 of FIG. 4, machining operation of the lower end face of the piston body 20 is easy comparing with that of the attenuating valve 30 shown in FIG. 1.

Figure 5:
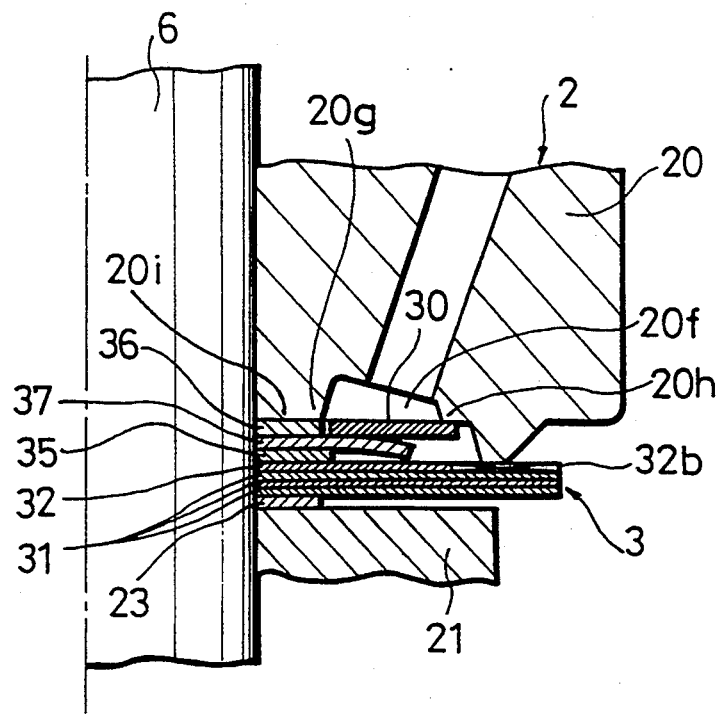

Referring now to FIG. 5, the attenuating valve 3 shown includes a leaf valve 30 which is disposed in a non-restricted condition.

In particular, the leaf valve 30 is normally received at an outer peripheral portion thereof on a valve seat 20h formed on a piston body 20 while an inner peripheral portion thereof is set in a floating condition without being received on a valve seat 20g formed at a radially inner portion of the piston body 20.

An annular seat 36 having the same thickness as the leaf valve 30 is disposed in the inside of the leaf valve 30 and received on the valve seat 20g of the piston body 20, and a valve stopper 37 having a curved cross section is mounted on a lower face of the annular seat 36 adjacent a lower face of the leaf valve 30.

Also in the attenuating valve 3 of FIG. 5, an annular seat 35 is interposed between an inner peripheral portion of the valve stopper 37 and an inner peripheral portion of a recessed leaf valve 32 below.

Accordingly, with the attenuating valve 3 of FIG. 5, even if an outer peripheral portion of the leaf valve 30 is deflected to a great extent in the medium or high speed range of the piston speed in which outer peripheral portions of leaf springs 31 are deflected to a great extent, the leaf valve 30 will make a movement like a lever to move the inner peripheral portion thereof into an annular groove 20f formed in the piston body 20. Consequently, a great bending phenomenon does not take place at the inner peripheral portion of the leaf valve 30.

Figure 6:
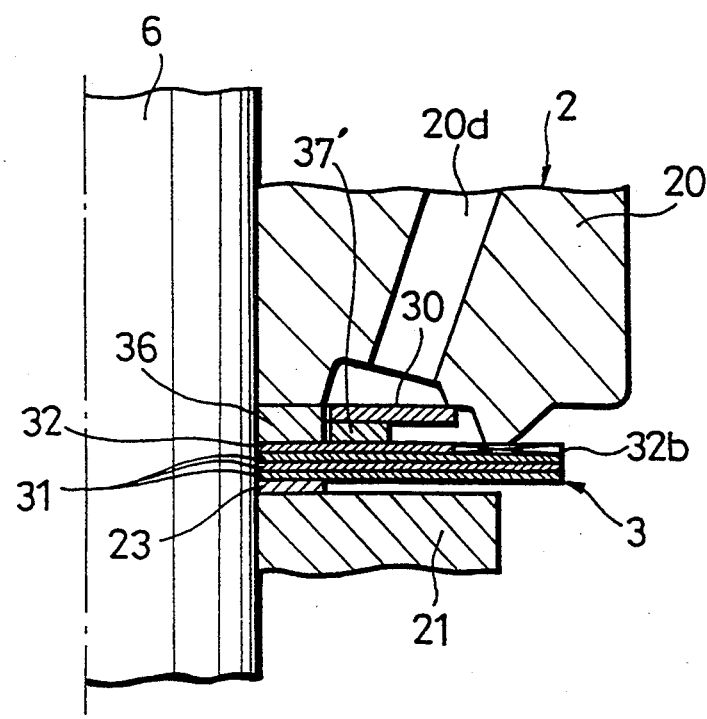

Referring now to FIG. 6, the attenuating valve 3 shown includes a leaf valve 30 which is disposed in a non-restricted condition similarly as in the attenuating valve 3 of FIG. 5. A valve stopper 37' is disposed on an inner peripheral portion of a lower face of the leaf valve 30, and a guiding annular seat 37' is disposed radially inwardly of the leaf valve 30 and valve stopper 37.

Consequently, the leaf valve 30 is supported on the valve stopper 37 below, and when an outer peripheral portion of the leaf valve 30 is deflected to a great extent in the medium or high speed range of the piston speed in which outer peripheral portions of leaf valves 31 are deflected to a great extent, the leaf valve 30 is supported at an outer peripheral portion of the valve stopper 37.

Accordingly, also with the attenuating valve 3 of FIG. 6, the leaf valve 30 makes a movement like a lever to move an inner peripheral portion thereof into an annular groove 20f formed in a piston body 20, and consequently, a great bending phenomenon does not take place at the inner peripheral portion of the leaf valve 30.

While the hydraulic shock absorber described above is constructed such that the attenuating valve 3 is disposed in the piston member 2 in the cylinder 1, similar effects can be attained otherwise if the attenuating valve 3 is disposed at a base valve section (not shown) at a lower end in the inside of the cylinder 1 or at an attenuating force generating section (not shown) installed in a separate tank outside the cylinder 1 or at some other section.

Figure 7:
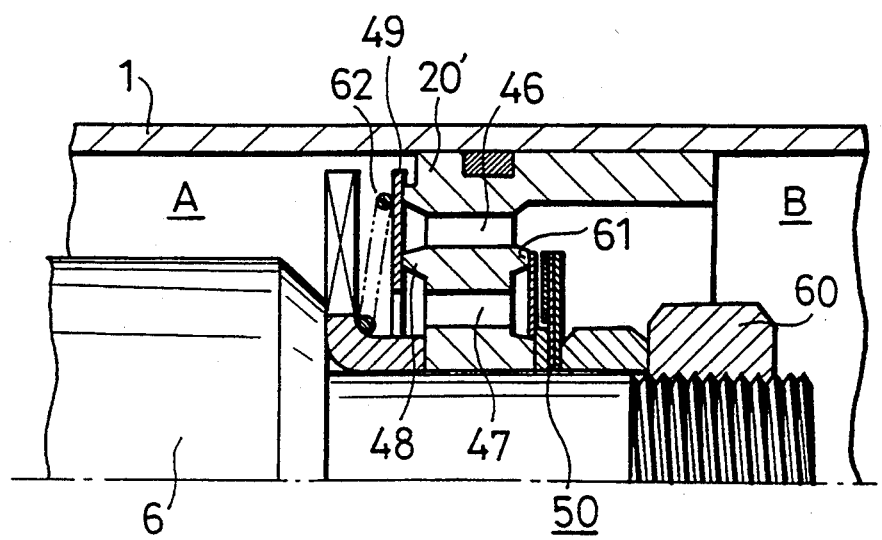
FIG. 7 is a partial vertical sectional front elevational view of another hydraulic shock absorber showing another embodiment of the present invention.

Referring now to FIG. 7, there is shown another hydraulic shock absorber to which the present invention is applied. The shock absorber shown includes a cylinder 1, and a piston body 20' secured to an end of a piston rod 6 by means of a nut 60 and disposed for sliding movement in the cylinder 1. Hydraulic operating fluid is provided in oil chambers A and B defined by the piston body 20' in the cylinder 1.

The piston body 20' has a pair of passages 46 and 47 perforated therein so as to communicate the oil chambers A and B with each other. A non-return valve 49 is normally held in resilient contact with a valve seat face 48 around the passage 46 on the oil chamber A side under the urging force of a spring 62 while a leaf valve mechanism 50 which serves as an attenuating valve for generating an expansion side attenuating force is disposed on a valve seat face 61 around the other passage 47 on the oil chamber B side.

Figure 8:
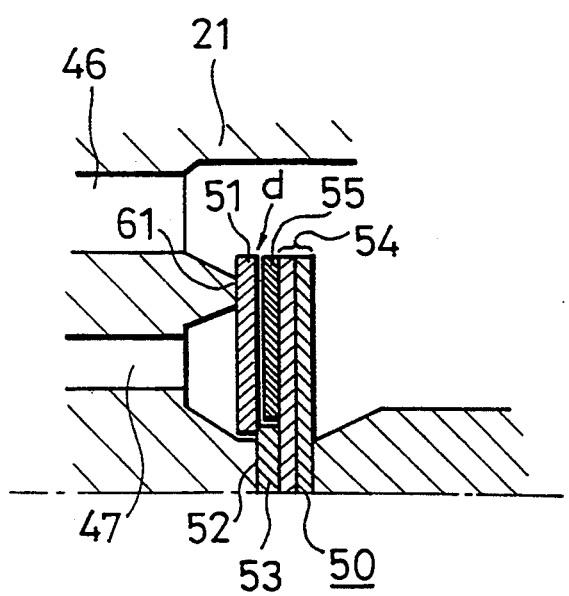
FIGS. 8, 9 and 10 are enlarged vertical sectional front elevational views of different attenuating valves for use with the hydraulic shock absorber of FIG. 7.

Referring to FIG. 8, the leaf valve mechanism 50 includes a leaf valve 51 for a lower speed range having an outer peripheral portion of a face thereof held in contact with the seat face 61 and having an inner peripheral portion of the other face thereof spaced away from an inner peripheral seat face 52 and held in contact with a spacer 53 serving as a valve stopper, and a multiple leaf valve 54 for a medium or high speed range having the same diameter as the leaf valve 51. The leaf valve 51 and the multiple leaf valve 54 are disposed in vertical planes in an overlapping relationship in a perpendicular direction with the spacer 53 interposed therebetween, and the leaf valve 51 is supported at the radially inward end side thereof for up and down floating movement on the spacer 53 while the other leaf valve 54 is secured at an inner peripheral portion thereof such that the leaf valves 51 and 54 function using the valve seat face 61 as a common valve controlling acting face. An annular float valve 55 having a thickness smaller than that of the spacer 53 is secured to the leaf valve 54 and located in a gap between the leaf valves 51 and 54.

Consequently, a gap d smaller than the thickness of the spacer 53 is formed between the leaf valve 51 and the float valve 55 such that it may define an amount of a lift when the leaf valve 51 is deflected.

Accordingly, hydraulic operating fluid in the oil chamber A which is pressurized in an expansion stroke of operation of the piston is introduced to the leaf valve mechanism 50 by way of the passage 47 and deflects the leaf valve 51 of the leaf valve mechanism 50 in accordance with a difference in pressure between the oil chambers A and B to space the leaf valve 51 away from the valve seat face 61 so that it passes between the leaf valve 51 and the valve seat face 61 and flows into the oil chamber B.

In this instance, the amount of a lift of the leaf valve 51 is equal to the difference in thickness between the spacer 53 and the float valve 55, that is, equal to the gap d.

Since such spacer 53 and float valve 55 can be selected in suitable combination from various general purpose spacers and leaf valves already in use, the width of selection of such lift amount is very great, and very fine selection is available.

Further, since the leaf valve 51 is not secured at an inner peripheral portion thereof, it has a comparatively low spring constant and hence is high in deflection and low in occurrence of local distorting force.

Figure 9:
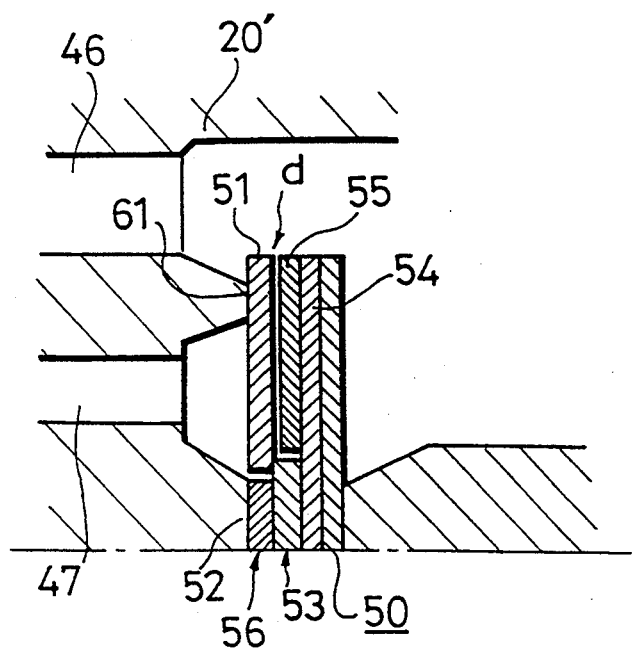
Figure 10:
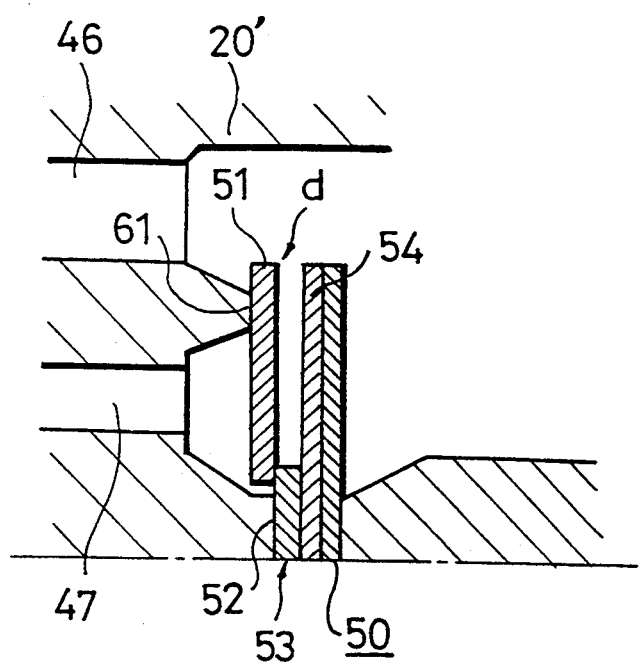
Figure 11:
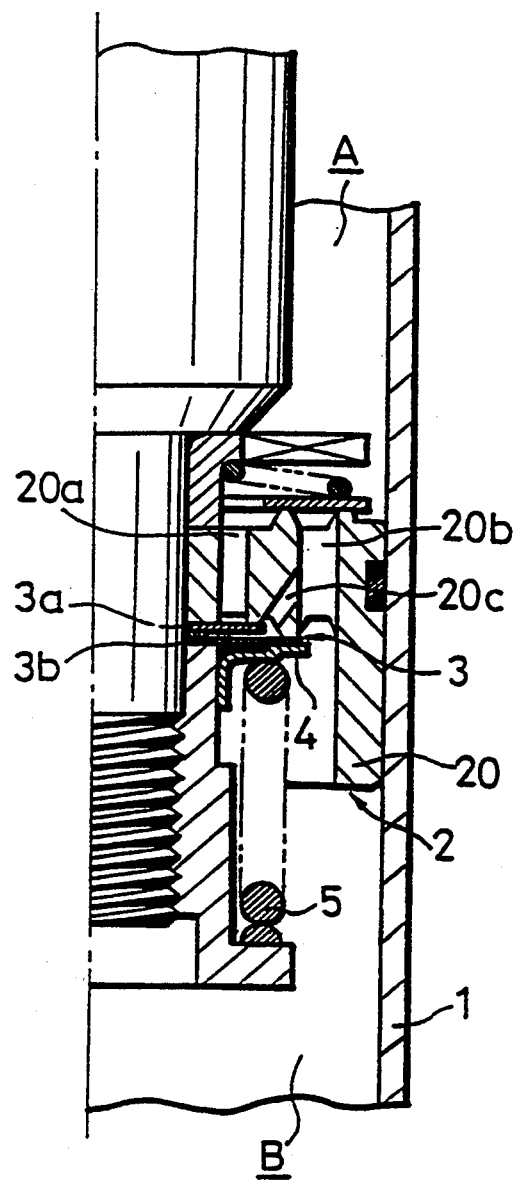
FIG. 11 is a partial vertical sectional front elevational view of a conventional hydraulic shock absorber.

On the other hand, as one can clearly see from FIG. 8–10, when the hydraulic shock absorber is making an expanding movement and the piston speed is in the medium or high speed range, hydraulic operating fluid in oil chamber A in the cylinder 1 deflects the outer peripheral portion of the leaf valve 51 for the low speed range, which then deflects an outer peripheral portion of the leaf valve 54 so that it flows into oil chamber B and another predetermined attenuating force is generated. The leaf valve 51 deflects downstream and contacts the leaf valve 54. The leaf valve 54 the acts as a valve spring by applying a stronger force against the leaf valve 51 so that the type of attenuation force changes for medium and high speed.

Referring now to FIG. 9, there is shown a modification to the leaf valve mechanism shown in FIG. 8. While the leaf valve mechanism of FIG. 8 is constructed such that the valve seat face 61 and the inner peripheral seat face 52 are formed in planes spaced from each other by a distance equal to the thickness of the leaf valve 51, in the modified leaf valve mechanism shown in FIG. 9, such two seat faces 61 and 52 are formed in the same plate while a spacer 56 having a thickness equal to the thickness of the leaf valve 51 is interposed between an inner peripheral seat face 52 and a spacer 53. In the present arrangement, the valve seat faces can be worked readily.

Also with the modified leaf valve mechanism, characteristics of the hydraulic shock absorber in the very low speed range resulting from selection of the gap d, that is, from determination of an amount of a lift are similar to those of the leaf valve mechanism of FIG. 8.

Then, if selection of the gap d can be achieved appropriately with the spacer 53, then the float valve 55 may be omitted as in a further modified leaf valve mechanism shown in FIG. 10.

With the hydraulic shock absorber described above, since the leaf valve for the generation of an attenuating force in the very low speed range of the piston speed and the leaf valve for the generation of an attenuating force in the medium or high speed range of the piston speed are set separately from each other, there is an advantage that controls of attenuating force for different speeds of the piston can be made independently of each other.

Also, with the hydraulic shock absorber, the leaf valve for the very low speed range of the piston speed is not deflected excessively when the leaf valve for the medium or high speed range of the piston speed makes a deflecting movement, and accordingly, no excessive load is applied to the leaf valve for the very low speed range and a possible trouble such as a break of the leaf valve for the very low speed range is prevented. Accordingly, there is another advantage that the durability of the leaf valve for the very low speed range against deflection is improved significantly and the life of such leaf valve is increased.

Further, where the attenuating valve is of the type wherein the two leaf valves for the low speed range and the medium of high speed range having equal diametrical dimensions are disposed to act upon a common valve seat face, the valve device itself can be reduced in size compared with a valve device which includes two seat faces located in planes spaced from each other, and the degree of freedom in designing the leaf valve particularly for the low speed range is wide. Consequently, the valve device can be applied even to a shock absorber having a small diameter. Further, since the leaf valve for the low speed range is disposed in a non-restricted condition due to contact thereof with the valve stopper, the spring constant of the leaf valve for the low speed range itself can be decreased, which increases the width of selection of valves and increases the degree of freedom in setting of attenuating force. Besides, since the stress of the leaf valve for the low speed range upon deflection is low and the local deflection is little, the leaf valve for the low speed range is superior in durability.

What is claimed is:
1. A hydraulic shock absorber, comprising:
a cylinder;
a wall member defining a first hydraulic fluid chamber and a second hydraulic fluid chamber;
a hydraulic fluid port defined by said wall member providing communication between said first hydraulic fluid chamber and said second hydraulic fluid chamber;
a valve stopper positioned on an end of said port, said valve stopper extending partially across said end of said port;
high speed valve means for restricting fluid flow from said first hydraulic fluid chamber to said second hydraulic fluid chamber below a force corresponding to a medium or high speed hydraulic fluid flow range and attenuating fluid flow in said medium or high speed range, including plural leaf springs fixedly attached at one end to said wall and cooperating with a valve seat to define a gap and to control high speed fluid flow between said first hydraulic fluid chamber and said second hydraulic fluid chamber;
low speed valve means including a low speed leaf valve positioned in said gap and acting against said valve seat to prevent fluid communication between said first hydraulic fluid chamber and said second hydraulic fluid chamber through said port and for moving in said gap, away from said valve seat under force corresponding to hydraulic fluid flow in a low speed range, said low speed leaf valve having a downstream inner peripheral surface abutting an upper surface of said valve stopper, and said downstream inner peripheral surface being partially moveable away from said valve stopper in response to fluid flow between said first and second chambers, said valve stopper being supported between said high speed valve means and said wall member, a thickness of said valve stopper spacing said low speed leaf valve from said plurality of leaf valves of said high speed leaf means to adjust damping characteristics of the shock absorber.

2. A shock absorber according to claim 1, wherein:
a float valve is positioned within said gap, floatingly connected to said wall member for movement between said high speed valve means and said low speed leaf valve, said float valve having a thickness which is smaller than said thickness of said valve stopper.

3. A shock absorber, according to claim 1, wherein:
said wall member has an inner peripheral end face formed in a common plane with said valve seat.

4. A shock absorber, according to claim 3, wherein:
a spacer is provided between said valve stopper and said wall inner peripheral end face.

5. A shock absorber, comprising:
a cylinder;
a piston positioned in said cylinder and defining a first chamber on a first side of said piston, and a second chamber on a second side of said piston, said piston defining a port providing communication from said first chamber into said second chamber;
a valve seat around a first side of an end of said port, said end of said port being adjacent said second chamber;
a valve stopper positioned on a second side of said end of said port, said valve stopper being positioned downstream of said valve seat and extending partially across said end of said port;
a low speed leaf valve including an upstream outer peripheral surface and a downstream inner peripheral surface, said upstream outer peripheral surface abutting said valve seat and said downstream inner peripheral surface abutting said valve stopper, said upstream outer peripheral surface being movable away from said valve seat in response to fluid flow between said first and second chambers, said downstream inner peripheral surface being partially movable away from said valve stopper in response to fluid flow between said first and second chambers;
a high speed leaf valve including an inner peripheral portion fixedly attached to said second side of said end of said port at a position downstream of said valve stopper, said high speed leaf valve extending across and downstream of said end of said port and being positioned spaced from said low speed leaf valve, said high speed leaf valve flexing away from said valve seat in response to flexing of said low speed leaf valve away from said valve seat.

6. A shock absorber in accordance with claim 5, wherein:
said high speed leaf valve flexes away from said valve seat in response to flexing of said low speed leaf valve away from said valve seat beyond a predetermined value.

7. A shock absorber in accordance with claim 6, wherein:
said predetermined value is dependent on a distance said high speed leaf valve is spaced from said low speed leaf valve.

8. A shock absorber in accordance with claim 6, wherein:
a float valve is positioned between said low speed vane and said high speed valve;
said predetermined value is dependent on a distance said high speed leaf valve is spaced from said low speed leaf valve and a thickness of said float valve.

9. A shock absorber in accordance with claim 5, wherein:
said high speed valve is a leaf spring valve which applies a leaf spring force to said low speed valve when said low speed leaf valve flexes away from said valve seat beyond a predetermined value.

10. A shock absorber in accordance with claim 5, wherein:
said high speed leaf valve including an outer peripheral portion cooperating with said valve seat to control high speed fluid flow between said first and second chambers.

* * * * *